(12) United States Patent
Drake et al.

(10) Patent No.: US 11,138,619 B2
(45) Date of Patent: Oct. 5, 2021

(54) USING DIGITAL TRAFFIC DATA FOR ANALYSIS

(71) Applicant: T-Mobile USA, Inc., Bellevue, WA (US)

(72) Inventors: Aaron Drake, Sammamish, WA (US); Araceli Lesko, Bainbridge Island, WA (US)

(73) Assignee: T-Mobile USA, Inc., Bellevue, WA (US)

(*) Notice: Subject to any disclaimer, the term of this patent is extended or adjusted under 35 U.S.C. 154(b) by 420 days.

(21) Appl. No.: 15/697,427

(22) Filed: Sep. 6, 2017

(65) Prior Publication Data

US 2019/0073686 A1    Mar. 7, 2019

(51) Int. Cl.
  *G06Q 30/00* (2012.01)
  *G06Q 30/02* (2012.01)
  *H04W 4/02* (2018.01)
  *G06Q 10/08* (2012.01)

(52) U.S. Cl.
  CPC ..... *G06Q 30/0205* (2013.01); *G06Q 30/0201* (2013.01); *H04W 4/02* (2013.01); *G06Q 10/087* (2013.01); *G06Q 30/0246* (2013.01)

(58) Field of Classification Search
  None
  See application file for complete search history.

(56) References Cited

U.S. PATENT DOCUMENTS

| | | | | |
|---|---|---|---|---|
| 7,092,964 | B1* | 8/2006 | Dougherty | G06Q 30/02 |
| | | | | 707/999.003 |
| 8,073,460 | B1* | 12/2011 | Scofield | H04W 4/21 |
| | | | | 455/456.1 |
| 8,229,458 | B2 | 7/2012 | Busch | |
| 9,955,297 | B2* | 4/2018 | Kostka | H04W 4/21 |
| 2011/0238522 | A1 | 9/2011 | Stevens et al. | |
| 2012/0271717 | A1* | 10/2012 | Postrel | G06Q 30/02 |
| | | | | 705/14.58 |
| 2013/0041734 | A1* | 2/2013 | Dean | G06Q 20/387 |
| | | | | 705/14.23 |
| 2013/0339185 | A1 | 12/2013 | Johnson | |
| 2015/0004999 | A1 | 1/2015 | Schuler et al. | |
| 2015/0264532 | A1* | 9/2015 | Spears | H04W 4/029 |
| | | | | 455/456.3 |

(Continued)

OTHER PUBLICATIONS

International Mobile Subscriber Identity, Sep. 26, 2016, Wikipedia, printed through www.archive.org (Year: 2016).*

(Continued)

*Primary Examiner* — Naresh Vig
(74) *Attorney, Agent, or Firm* — Han Santos, PLLC

(57) ABSTRACT

Techniques are disclosed for implementing digital traffic data for analysis. In some examples, a telecommunications network determines an identity of a user associated with a user device that communicates with the telecommunications network. The telecommunications network identifies a physical location of the user device based on the user device communicating with a first transceiver of the telecommunications network. Then, the telecommunications network determines that the physical location of the user device corresponds to a first commercial location, and stores an indication that the user has visited the first commercial location.

21 Claims, 8 Drawing Sheets

(56) References Cited

U.S. PATENT DOCUMENTS

2016/0027029 A1 1/2016 Poole
2016/0323711 A1* 11/2016 Spears .................. H04W 4/024

OTHER PUBLICATIONS

Rong Wang, How Do Cell Phone Work, Dec. 20, 2014, Pong Pulse (Year: 2014).*
Chon et al., "Automatically Characterizing Places with Opportunistic CrowdSensing using Smartphones", Sep. 2012, ACM (Year: 2012).*
International Search Report and Written Opinion for PCT Application No. PCT/US2018/049414, dated Dec. 27, 2018, 15 pages.

* cited by examiner

USING DIGITAL TRAFFIC DATA FOR ANALYSIS

BACKGROUND

User devices (sometimes referred to as user equipment) include tablet computers and mobile phones. In the course of sending communications via a telecommunications network, these user devices communicate with various wireless points on a telecommunications network, such as with one or more macrocells, picocells, and WiFi access points.

BRIEF DESCRIPTION OF THE DRAWINGS

The Detailed Description is set forth with reference to the accompanying Figures.

DETAILED DESCRIPTION

Overview

Figure 1:
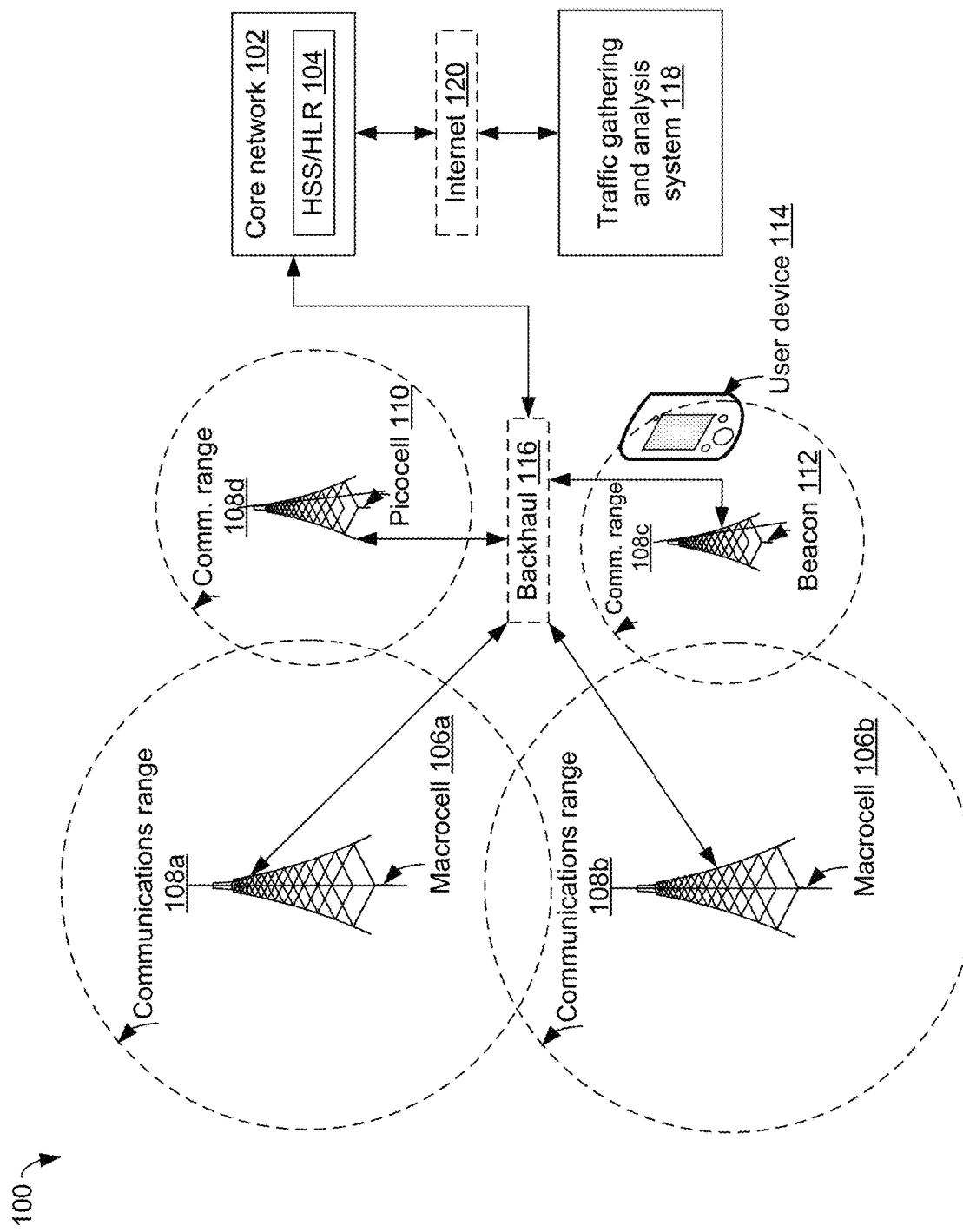
FIG. 1 illustrates an example system architecture for using digital traffic data for analysis.

There are many ways in which information about how people physically move about the world, or within a store can be utilized to improve the operations of a business or other entity. For example, information about where people travel during their day can be used to select a physical location for a store. Information about where customers of a store travel from to reach the store can also be used to select a physical location for a store.

Within a store, information about where customers travel can also be used. For example, this intra-store information can be used to make decisions on which inventory to stock (such as based on which shelves customers linger by), or to make decisions on how to arrange inventory within the store.

There can be approaches to making decisions like locating new stores based on physical traffic data to existing stores (i.e., counting customers who enter a store). However, this physical traffic data may be both harder to gather, less reliable, and offer less information than digital traffic data.

Digital traffic data for people comprises data that can be determined from a person's user device. For example, where a user opts in to having the location of his or her user device shared for this purpose, physical location information can be gathered, securely stored, and anonymized and/or aggregated to remove personally identifiable information.

User device location information can be determined based on a part of a telecommunications network that the user device is in communication with, such as via a Long-Term Evolution (LTE) protocol. For example a telecommunications network can be made up of one or more macrocells, microcells, and beacons. A macrocell generally is a telecommunications transceiver that provides telecommunications coverage over a larger area than a microcell. A microcell, a picocell, or a femtocell, generally is a telecommunications transceiver that provides telecommunications coverage over a smaller area than a macrocell.

A beacon generally is a small cell that operates over a smaller area than a microcell. In some embodiments, a beacon does not provide telecommunications functionality to a user device, and does not advertise any services to user devices that communicate with the beacon. Rather, a beacon communicates with a user device, such as via a LTE protocol, to determine that the user device is located within the communication range of the beacon. This process of the beacon determining that the user device is located within the communication range of the beacon can take on the order of milliseconds, during which the user device can experience a service interruption, since it is not connected to a microcell or macrocell that offers telecommunications connectivity.

There are also other ways in which digital traffic information may be obtained. For example, a user device may communicate with a WiFi access point using an 802.11 wireless communications protocol, or with an access point or beacon using a Bluetooth wireless communications protocol.

As a user device physically moves within a telecommunications network, the user device can connect to different transceivers in the telecommunications network. Each of these transceivers can have a known physical location, and a known communication range, so that an area in which the user device is located when communicating with a particular transceiver can be determined. In addition to determining where a user device has been located, a time at which the user device was in that location can be determined as well, so that a route traveled by the user device over time can be determined.

This information about how people physically move about the world or within a store, along with other information as described below, can be utilized to improve the operations of a business or other entity.

Exemplary Hardware, Software and Communications Environment

FIG. 1 illustrates an example system architecture 100 for using digital traffic data for analysis. It can be appreciated that this Figure shows an example of a network architecture, and that there can be other network architectures in which using digital traffic data for analysis can be implemented. As depicted, system architecture comprises macrocell 106a (with corresponding communications range 108a that identifies a distance from macrocell 106a that a user device can be located and in communication with macrocell 106a), macrocell 106b (with corresponding communication range 108b), picocell 110 (with corresponding communication range 108d), beacon 112 (with corresponding communication range 108c), user device 114, backhaul 116, core network 102 (which contains home subscriber server (HSS)/home location register (HLR) 104), Internet 120, and traffic gathering and analysis system 118.

Macrocell 106a, macrocell 106b, picocell 110, and beacon 112 are all connected to core network 102 via backhaul 116. Backhaul 116 comprises a communications connection between a core of a telecommunications network and an edge to which a user device can connect. In some embodiments, beacon 112 is not connected directly to backhaul 116. Rather, beacon 112 is physically located within a communication range of a macrocell or a picocell that is connected directly to backhaul 116, and beacon 112 communicates with that macrocell or picocell as a way to access backhaul 116, and by extension, core network 102.

In some examples, a beacon can be considered to be a type of small cell device. A beacon can have onboard encryption for storing the digital location data that it gathers. Then, the beacon can transmit the digital location data back to the core network or the traffic gathering and analysis system via a Hyper Text Transfer Protocol Secure (HTTPS) network communications protocol, so that the digital location data is encrypted again for transit.

Where a beacon is located within a store, a user device may interact with a beacon as follows. A user device is connected to a telecommunications network that includes the beacon, such as via a macrocell whose range encompasses the range of the beacon. When the user enters a store and brings his or her user device within range of the beacon, the user device may connect to the beacon, determine that the beacon does not advertise any services, and disconnect, returning to communicating with the macrocell. This interaction between the user device and the beacon may last from a few milliseconds up through a few seconds. While the user device communicates with the beacon (which offers no services, such as the ability to conduct phone calls), the user device may experience a brief service interruption.

A beacon can operate at lower power than a macrocell, so even when a user device is located right next to a beacon, the user device can still be receiving a stronger signal from the macrocell, so not switch to the beacon based solely on the beacon's relative signal strength. The telecommunications network can set the priorities for connecting to transceivers such that the user device does connect to the beacon in this scenario. The telecommunications network can propagate to a user device information about neighboring transceivers and a set of relative priorities for connecting to those transceivers where the user device receives a sufficient signal from multiple of those transceivers.

Core network 102 comprises HSS/HLR 104. HSS/HLR 104 is a master user database that contains subscriber profiles for one or more user device users that are associated with the home network, performs authentication and authorization for a user's user device, and can provide information about a user device's physical location and Internet Protocol (IP) information. HSS/HLR 104 can store digital traffic data in tuples that comprise a site identifier for a transceiver, a site location of the transceiver, and an identifier of the user device (such as an International Mobile Subscriber Identity (IMSI) or a Mobile Station International Subscriber Directory Number (MSISDN)). A MSISDN is generally a number that uniquely identifies a subscription in some telecommunications networks.

User device 114 is registered to a telecommunications network of core network 102. User device 114 has a corresponding data entry in HSS/HLR 104 that identifies user device 114 as being permitted to register to the telecommunications network. Once registered to the telecommunications network, user device 114 can communicate with the transceivers of the telecommunications network (i.e., macrocell 106a, macrocell 106b, picocell 110, and beacon 112) to access services of the telecommunications network, where offered by the corresponding transceiver. Additionally, location information for user device 114 can be gathered in the course of user device 114 communicating with the transceivers, and be securely transmitted to and securely stored by HSS/HLR 104.

Where HSS/HLR 104 has securely stored location information for user device 114, that location information can be analyzed by traffic gathering and analysis system 118. Traffic gathering and analysis system 118 can receive location information from HSS/HLR 104 via Internet 120, and then analyze the location information to make determinations such as where to physically locate a store, what inventory to acquire, how to place inventory within a store, and to what degree advertisements or promotions are effective.

Traffic gathering and analysis system 118 may correlate location information for a user device (along with times at which the location information was gathered) along with other information, such as user identity information for the user device that is stored in HSS/HLR 104, other user information for the user maintained by the telecommunications network (e.g., an identifier for a family plan that corresponds to the user device), telemetry information for services used by the user device while present at a particular location (e.g., making a phone call, sending a text message, or uploading a photo), and information from third parties (e.g., demographic information about the user).

Traffic gathering and analysis system 118 can perform a variety of analyses based on the gathered information. For example, knowing a user's home address for billing purposes, traffic gathering and analysis system 118 can determine how far various users travel to a particular store. Based on knowing how far various users travel to a particular store, traffic gathering and analysis system 118 can determine whether to open a new store, relocate a current store, or close a store. Traffic gathering and analysis system 118 can also determine which shelves or locations within a store users spend the most time near. From this, traffic gathering and analysis system 118 can make inventory decisions.

Information from Call Data Records (CDRs) and Event Data Records (EDRs) can be maintained by the telecommunications network, and used for analysis by traffic gathering and analysis system 118. CDR data can include records of who has called whom, the amount of time each call lasts, and Short Message Service (SMS) data used. Information from EDRs can include similar information as CDRs but for data, like an amount of data used, data overages that are charged for (e.g., a charge for a user going above his or her 2 GB/mo allotment), and websites visited.

Analysis to determine a store location may extend beyond determining a location that is close to the home of a plurality of users. For example, it may be observed that most people do not visit a store that is closest to their home. They may visit a store that is close to their work, or is between home and work. Or, they may stop at a particular store because it is on the right side of the road, so can be accessed without making a left turn across traffic. So, traffic gathering and analysis system 118 may perform analysis to determine if customers are skipping a closer store to visit another store, or if there is a cluster of people visiting a store whose homes are in a particular location.

Additionally, information about the cost to open and operate a store in a particular location may be used by traffic gathering and analysis system 118 in determining a location a new store, to move an existing store, or to close an existing store.

Example Computing Device for Digital Traffic Data Analysis

Figure 2:
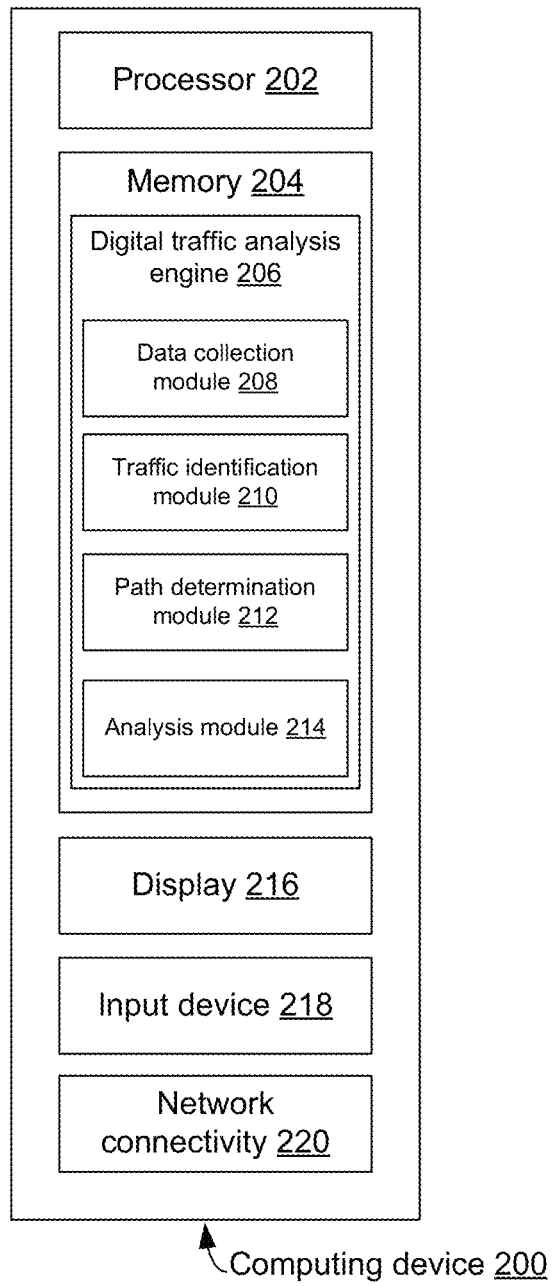
FIG. 2 illustrates an example block diagram of various components of a computing device for implementing digital traffic data for analysis.

FIG. 2 illustrates an example block diagram of various components of a computing device for implementing digital traffic data for analysis. As depicted, FIG. 2 contains computing device 200. In some examples, computing device 200 can be a user device (like user device 114 of FIG. 1) such as a mobile telephone, or a computer server. In other examples, computing device can be another type of computing device, such as a desktop computer or a laptop computer. However, in other embodiments, the computing devices 200 or components thereof may be virtual computing devices in the form of virtual machines or software containers that are hosted in a computing cloud.

In some examples, instances of computing device 200 can be used to implement one or more of core network 102, HSS/HLR 104, macrocells 106a-106c, picocell 110, beacon 112, user device 114, and traffic gathering and analysis system 118 of FIG. 1.

Computing device 200 contains several components, including processor 202, memory 204, display 216, input device 218, and network connectivity 220.

Processor 202 is a microprocessor, such as a central processing unit (CPU) that is configured to execute computer-executable instructions, including computer-executable instructions that make up data traffic analysis 206 of memory 204. Memory 204 can be implemented using computer-readable media, such as computer storage media, that is configured to store computer-executable instructions. Computer-readable media includes, at least, two types of computer-readable media, namely computer storage media and communications media.

Computer storage media includes non-transitory volatile and non-volatile, removable and non-removable media implemented in any method or technology for storage of information such as computer readable instructions, data structures, program modules, or other data. Computer storage media includes, but is not limited to, random access memory (RAM), read-only memory (ROM), electrically erasable programmable read-only memory (EEPROM), flash memory or other memory and/or storage technology, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication media.

Digital traffic analysis engine 206, as stored in the memory 204, are a set of computer executable instructions stored together as a discrete whole. Examples of software modules include binary executables such as static libraries, dynamically linked libraries, and executable programs. Other examples of software modules include interpreted executables that are executed on a run time such as servlets, applets, p-Code binaries, and Java binaries. Software modules include computer-executable instructions that can run in kernel mode and/or user mode.

In various embodiments, the digital traffic analysis engine 206 may include a data collection module 208, a traffic identification module 210, a path determination module 212, and an analysis module 214. The operations of the data collection module 208 is discussed in the context of FIG. 3, the operations of the traffic identification module 210 is discussed in the context of FIG. 4. Likewise, the operations of the path determination module 212 is discussed in the context of FIG. 5. The analysis module 214 may analyze the location information of user devices to make determinations such as where to physically locate a store, what inventory to acquire, how to place inventory within a store, and to what degree advertisements or promotions are effective. In various embodiments, the analysis module 214 may use various classification schemes (explicitly and/or implicitly trained) and/or systems may to analyze the data and make the determinations. A classifier is a function that maps an input attribute vector, x=(x1, x2, x3, x4, xn), to a confidence that the input belongs to a class, that is, f(x)=confidence(class). Such classification may employ a probabilistic and/or statistical-based analysis (e.g., factoring into the analysis utilities and costs) to perform the analysis and make the determinations. A support vector machine (SVM) is an example of a classifier that may be employed by the analysis module 214. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of inference may also be employed. Accordingly, the digital traffic analysis engine 206 can comprise a set of computer executable instructions that, when executed on processor 202, implement at least one of the operating procedures of one or more of FIGS. 6-8. Display 216 is a display, such as a liquid crystal display (LCD), that is configured to display visual output by computing device 200. Input device 218 is computer hardware configured to receive and process user input, such as touch input, or physical buttons that a user can press, as with a mouse or keyboard. Where input device 218 is configured to receive tough input, input device 210 and display 216 can together form a touch screen.

Network connectivity 220 comprises one or more radios configured to send and/or receive wireless communications. Network connectivity 220 can be configured to send and receive cellular network communications, such as via a Long-Term Evolution (LTE), Voice over LTE (VoLTE), or LTE in unlicensed spectrum (LTE-u) protocol. Network connectivity 220 can also be configured to send wireless local area network communications, such as via a WiFi protocol, or another 802.11 protocol. Network connectivity 220 can be configured to communicate via a near field communications protocol, such as a Bluetooth communications protocol. Network connectivity 220 can also be configured to communicate via physical connection, such as via a Transmission Control Protocol/Internet Protocol (TCP/IP) protocol via an Ethernet cable.

Figure 6:
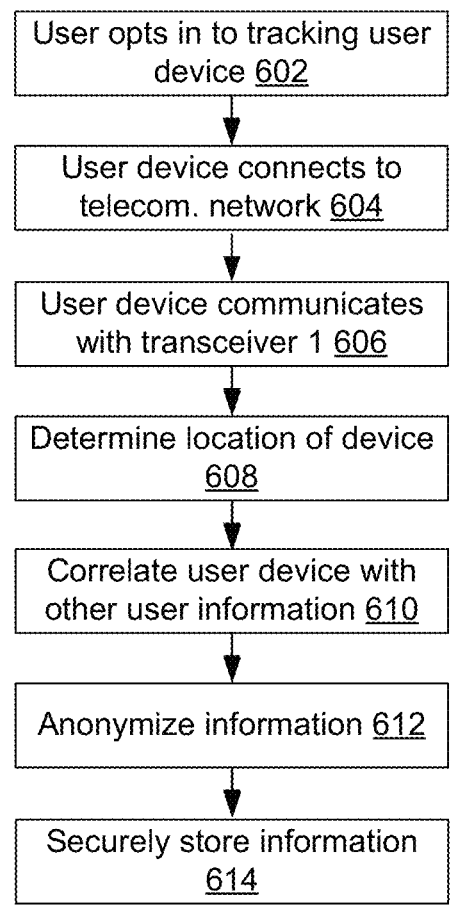
FIG. 6 illustrates a flow diagram of example operating procedures for gathering digital traffic data.
Figure 7:
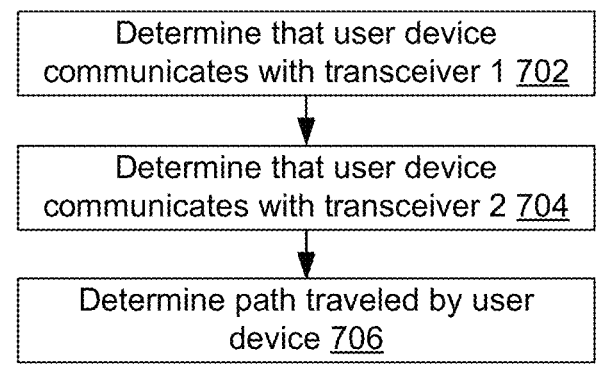
FIG. 7 illustrates a flow diagram of example operating procedures for determining a path traveled by a user device from digital traffic data.
Figure 8:
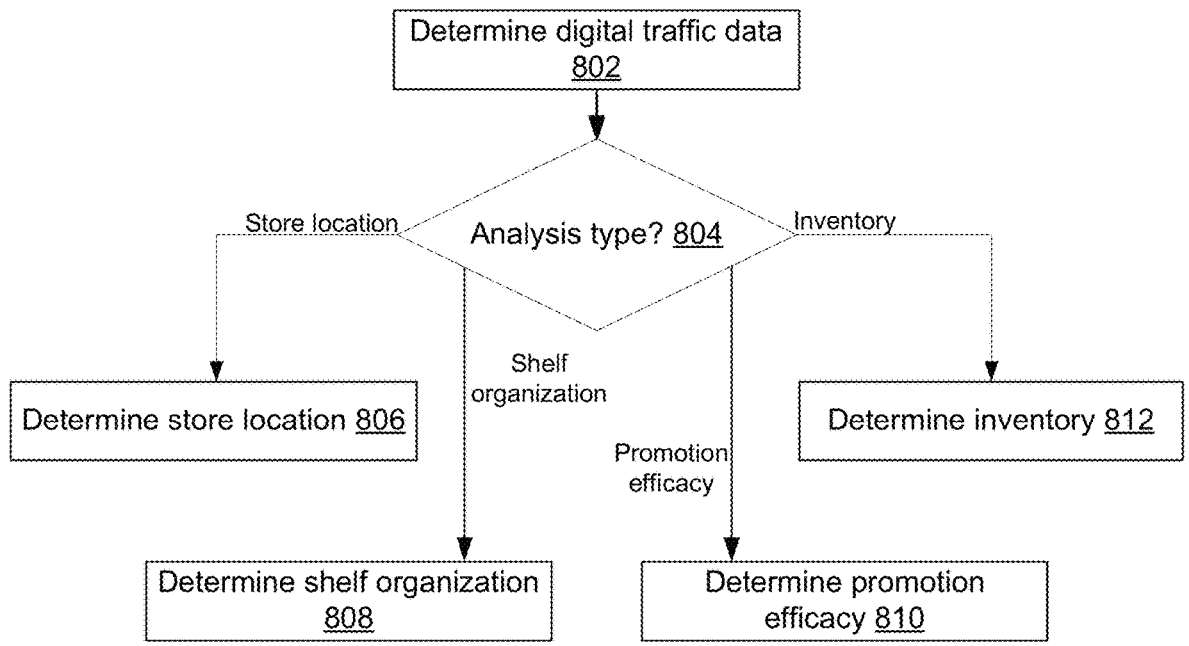
FIG. 8 illustrates a flow diagram of example operating procedures for analyzing digital traffic data.

One or more instances of the computing device 200 can be used to implement aspects of the disclosure, such as to implement the operating procedures of one or more of FIGS. 6-8. For example, the operating procedures of FIGS. 6-8 can be stored in memory 204 as digital traffic data gathering and analysis software modules 206 and executed by processor 202.

Implementing Transceivers to Gather Digital Traffic Data

Figure 3:
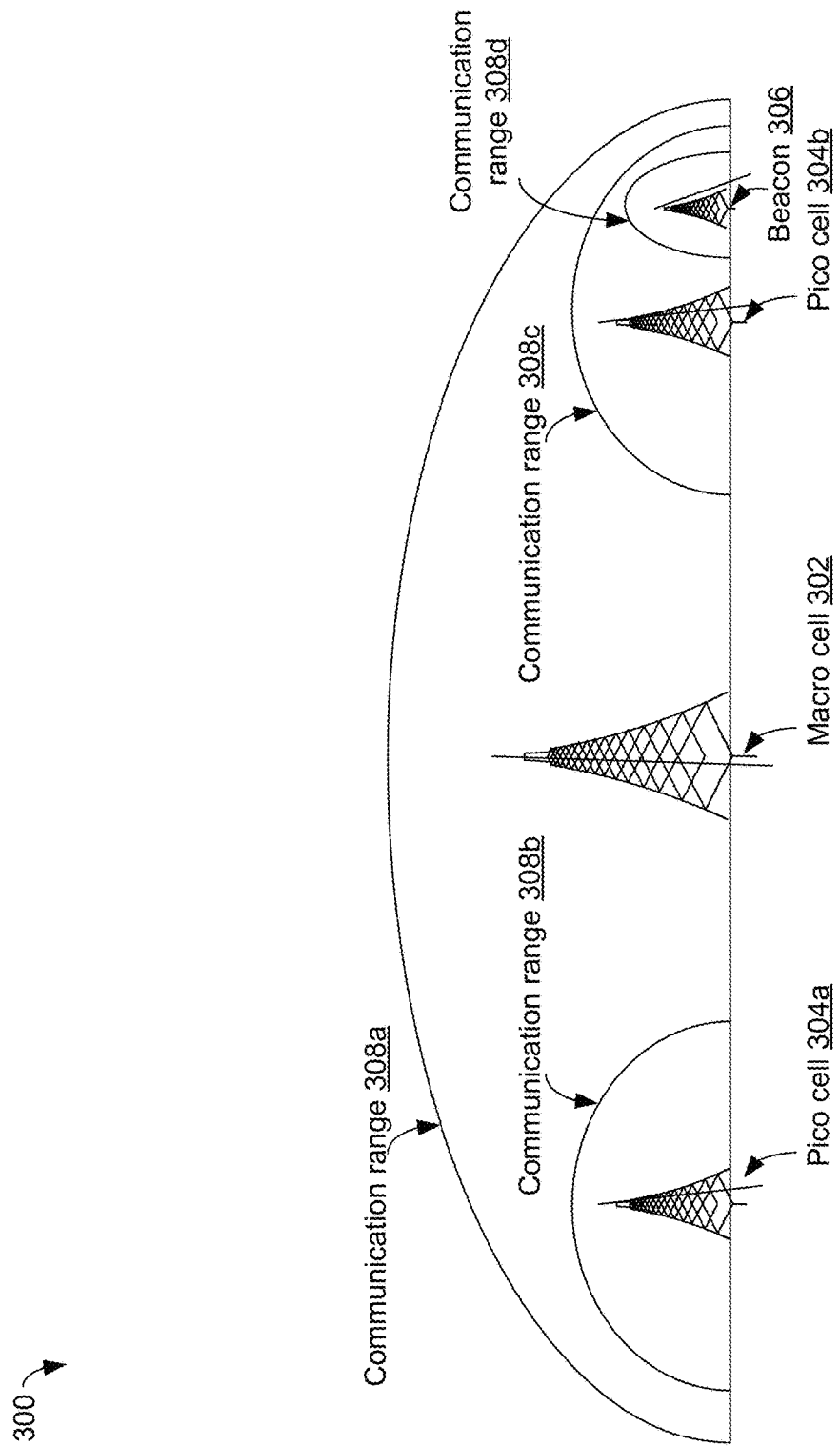
FIG. 3 illustrates an example implementation for using digital traffic data for analysis.

FIG. 3 illustrates an example implementation for using digital traffic data for analysis. In particular, FIG. 3 illustrates how multiple transceivers can have overlapping communications ranges, which are used to physically locate a user device that is connected to a telecommunications network.

Here, telecommunications network 300 comprises macrocell 302, picocell 304a, picocell 304b, and beacon 306. These four transceivers—namely, macrocell 302, picocell 304a, picocell 304b, and beacon 306—each have a associated communication range, which are respectively depicted as communication range 308a, communication range 308b, communication range 308c, and communication range 308d. Macrocell 302 can be similar to macrocell 106a or macrocell 106b of FIG. 1; picocell 304a and picocell 304b can be similar to picocell 110 of FIG. 1; and beacon 306 can be similar to beacon 112 of FIG. 1.

In FIG. 3, macrocell 302 has a communication range 308a of approximately 1,000 m from macrocell 302; picocell 304a has a communication range 308b of approximately 200 m from picocell 304a; picocell 304b has a communication range 308c of approximately 200 m from picocell 304b; and beacon 306 has a communication range 308d of approximately 5 m from beacon 306. The differing size of communication ranges 308a-d means that, when a user device is physically located by one of the corresponding transceivers, the accuracy of physically locating the user device can vary based on which transceiver is being used to physically locate the user device.

That is, if beacon 306 makes contact with the user device so as to identify that the user device is located within the beacon's communication range 308d of 5 m from the beacon, this measurement of the user device's physical location is more accurate than if the macrocell 302 makes contact with the user device so as to identify that the user device is located within the macrocell's communication range 308a of 1,000 m from the macrocell. It can be appreciated then that placing beacons within a communication range of a macrocell or a picocell can be used to more accurately physically locate a user device. In various embodiments, the beacons may report such contact data to the data collection module 208 of the digital traffic analysis engine 206.

It can be appreciated that some of these communication ranges overlap. For example, communication range 308a encompasses communication range 308b, communication range 308c, and communication range 308d. Then, communication range 308c also encompasses communication range 308d. Where a user device is physically located at a spot covered by multiple communication ranges, the user device can prioritize connecting to one of the transceivers over another based on a variety of criteria, such as by which transceiver is experiencing the lowest communication load, or which transceiver has the strongest signal strength as viewed by the user device.

Identifying Digital Traffic Data Within a Building

Figure 4:
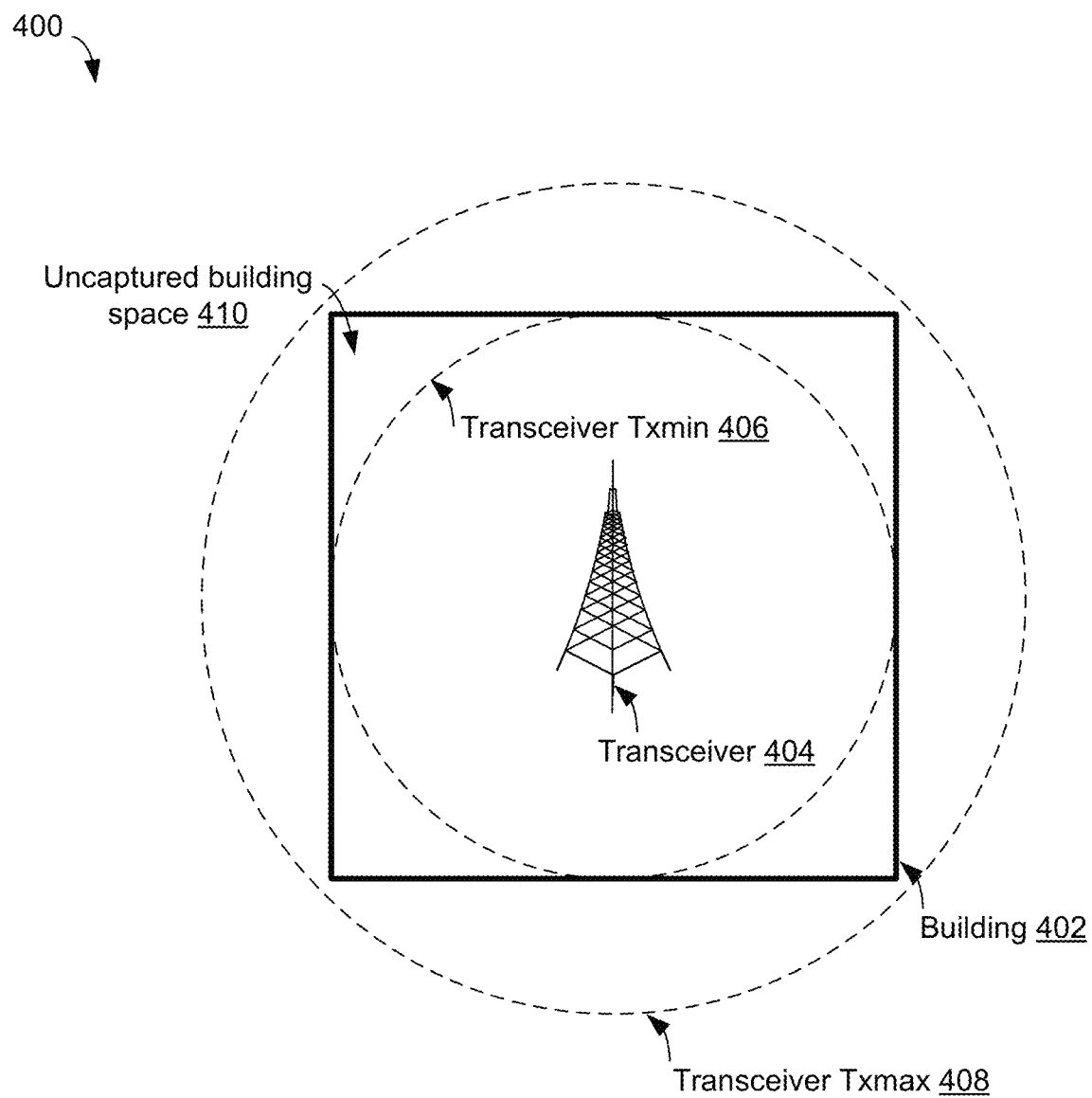
FIG. 4 illustrates an example implementation for identifying digital traffic data within a building.

FIG. 4 illustrates an example implementation for identifying digital traffic data within a building. The implementation is used by the traffic identification module 210 of the digital traffic analysis engine 206 to acquire user device location information within buildings for analysis. As depicted in implementation 400, there is building 402, with transceiver 404 located inside building 402. Transceiver 404 has a communication range defined by Tx min 406 and Tx max 408.

Tx min 406 is an area where, if a user device is located within this area, the user device will receive a strong enough signal from transceiver 404 to connect to transceiver 404. Tx max 408 is an area where, if a user device is located within Tx max 408 but outside of Tx min 406, a user device will be able to detect the existence of transceiver 404, but the user device will not connect to transceiver 406.

Tx min 408 and Tx max can be defined so as to capture the presence of user devices in building 402. As depicted, Tx min 406 does not reach the entirety of building 402, and there are spaces where a device can be located within building 402 but still outside of Tx min 406, such as uncaptured space in building 410. A choice can be made to have Tx min 406 set so that uncaptured space in building 410 exists where it is determined to accept false negatives (user devices being present in building 402 that are not detected by transceiver 404) rather than false positives (user devices that are outside of building 402 and that are still detected by transceiver 404).

For example, in a mall, where multiple stores share walls, it can be desired to avoid false positives, and set Tx min 406 so that Tx min 406 occurs entirely within building 402. It can be determined that false positives are to be avoided because those false positives can correspond to a user device being located in a neighboring store, and false positives are avoided to add certainty to which store the user device is located in.

Likewise, there can be cases where it is desired to avoid false negatives. For example, building 402 can be a stand-alone big box store, surrounded by a parking lot for building 402. Then, where Tx min 406 extends outside of building 402, there can be no uncaptured space within building 402, and any false positives will correspond to a user device being located in a parking lot for building 402, which can indicate that the user device is going to be brought into building 402 anyway.

Determining a Path Taken by a User Device

Figure 5:
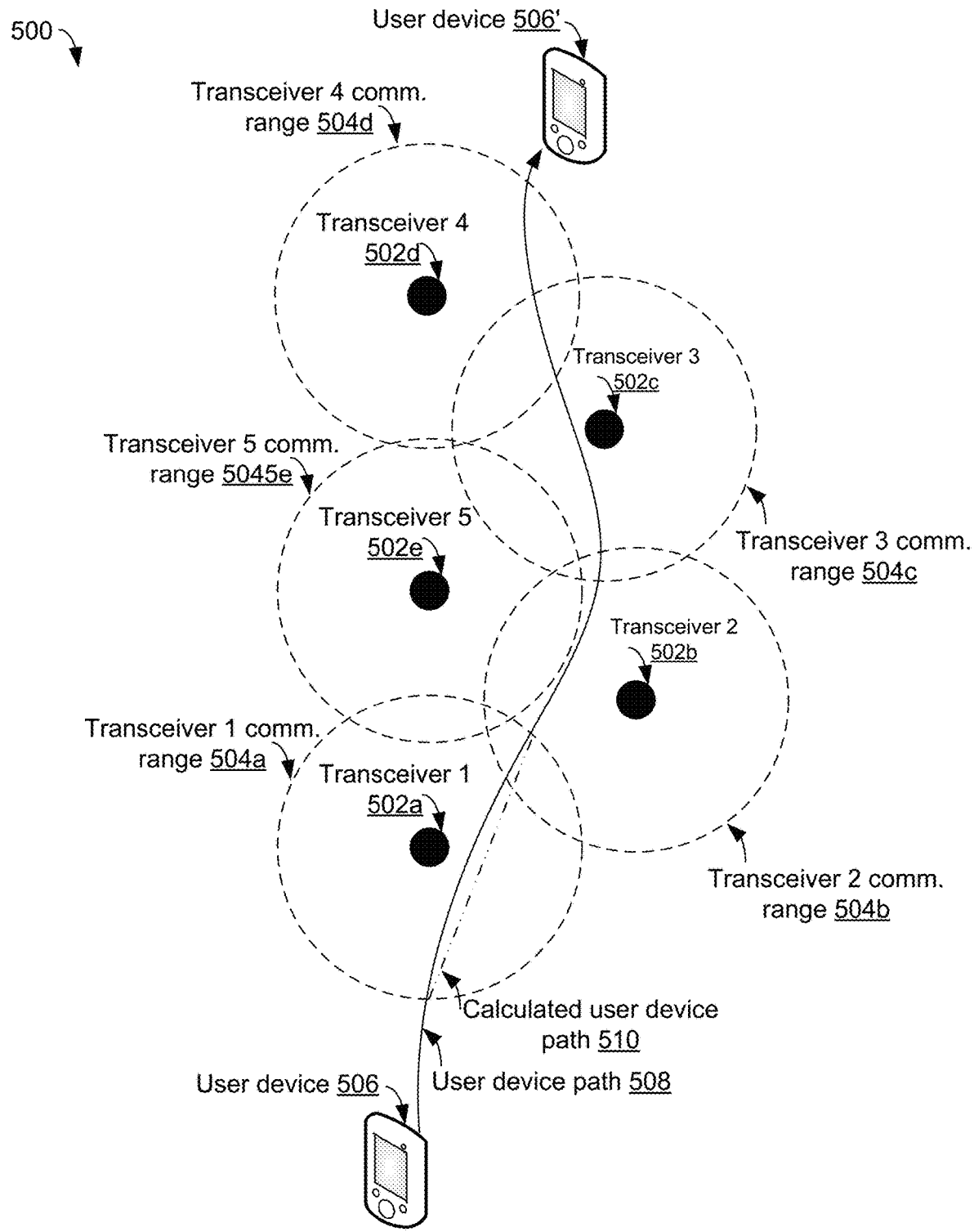
FIG. 5 illustrates an example implementation for determining a path taken by a user device based on communications with a telecommunications network's radios.

FIG. 5 illustrates an example implementation for determining a path taken by a user device based on communications with a telecommunications network's radios. The implementation is used by the path determination module 212 of the digital traffic analysis engine 206 to determine user device paths for analysis. As depicted in implementation 500, user device 506 travels user device path 508 over time, so that the user device is eventually physically located at user device 506'.

There are five transceivers: transceiver 1 502a, transceiver 2 502b, transceiver 3 502c, transceiver 4 502d, and transceiver 5 502e. These five transceivers each have an associated communication range, which respectively are transceiver 1 communication range 504a, transceiver 2 communication range 504b, transceiver 3 communication range 504c, transceiver 4 communication range 504d, and transceiver 5 communication range 504e. The user device path 508 travels through four of these communication ranges: transceiver 1 communication range 504a, transceiver 2 communication range 504b, transceiver 3 communication range 504c, and transceiver 4 communication range 504d, Rather than tracking the actual path that a user device travels within a transceiver's communication range, a path for the user device can be calculated. For example, calculated user device path 510 represents a calculation of a path that user device 506 travels within transceiver 1 communication range 504a, and it deviates from the actual path taken, as shown by user device path 508.

In some embodiments, a telecommunications network cannot be aware of where user device 506 is located within transceiver 1 communication range 504a when user device 506 is in communication with transceiver 1 502a. Rather, the telecommunications network can be able to determine an amount of time that user device 506 was located within transceiver 1 communication range 504a, along with which transceiver (if any) user device 506 was in communication with before and after user device 506 was in communication with transceiver 1 502a, and corresponding information for how user device 506 is in communication with other transceivers of the telecommunications network. Based on this information, the telecommunications network can determine calculated user device path 510 for user device 506.

In some embodiments, a telecommunications network can use additional, or other, information to determine calculated user device path 510. For example, in determining calculated user device path 510, the telecommunications network can utilize an equal power boundary map that defines an edge of each transceiver's communication range; a signal strength reported by user device 506 as it varies over time; and/or a map from which it can be determined that a user device generally follows roads.

Gathering Digital Traffic Data

FIG. 6 illustrates a flow diagram of example operating procedures 600 for gathering digital traffic data. It can be appreciated that the operating procedures of FIG. 6 are example operating procedures, and that there can be examples that implement more or fewer operations than are depicted, or that implement the operations in a different order than is depicted here. For instance, in some examples, operation 602 of a user opting in to sharing data can be implemented after operation 604 where a user's device connects to a telecommunications network.

It can also be appreciated that multiple of the operating procedures of FIGS. 6-8 can be implemented together. For example, the operating procedures of FIG. 6 can be implemented to gather digital traffic data, and the operating procedures of FIG. 8 can be implemented to analyze that gathered digital traffic data.

In some examples, the example operating procedures 600 of FIG. 6 can be implemented by telecommunications network 100, and in particular traffic gathering and analysis system 118, of FIG. 1 to gather and analyze digital traffic of user device 114.

Operating procedures 600 begin with operation 602. Operation 602 depicts a user of a user device opting in to sharing data. In some embodiments, operation 602 can comprise a user device receiving user input at a displayed user interface that a user opts in, or otherwise consents, to his or her user device sharing data for purposes such as to determine where to locate stores. In some embodiments, where a user opts in to sharing data, an indication of this opt in can be stored by a HSS/HLR of a telecommunications network, such as HSS/HLR 104 of FIG. 1.

In some embodiments, operation 602 comprises determining that the user of the user device opts in to sharing data. After operation 602, the operating procedures of FIG. 6 move to operation 604.

Operation 604 depicts the user device connecting to a telecommunications network. In some embodiments, where a user device is switched on, is switched from an airplane mode where telecommunications radios are turned off to an active mode where telecommunications radios are on, or moves into a location where it is visible by a transceiver of a telecommunications network, the user device can communicate with the telecommunications network to establish that the user device can access services via the telecommunications network.

For example, the user device can send one or more communications across the telecommunications network to a HSS/HLR that is located at a core network of the telecommunications network in the course of registering to the telecommunications network, and these communications can include the user device's IMSI.

The HSS/HLR can store a set of IMSIs along with an indication that the stored set of IMSIs correspond to user devices that are allowed to register to the telecommunications network. Where the HSS/HLR stores an indication that the user device's IMSI is permitted to register to the telecommunications network, then the HSS/HLR can permit the user device to register to the telecommunications network and use services of the telecommunications network.

In some embodiments, operation 604 comprises determining an identity of a user associated with a user device that communicates with a telecommunications network. After operation 604, the operating procedures of FIG. 6 move to operation 606.

Operation 606 depicts the user device communicating with a first transceiver of the telecommunications network. The user device can communicate with a first transceiver of a telecommunications network where the user device is physically located within a Tx min of the first transceiver. For example, this occurs in FIG. 1 where user device 114 is located within a Tx min of beacon 112 (here the Tx min is identified as communication range 108*c*).

In some embodiments, the telecommunications network comprises a second transceiver that has a range that is confined to a physical area corresponding to the commercial location, such as a beacon. After operation 606, the operating procedures of FIG. 6 move to operation 608.

Operation 608 depicts determining a physical location of the user device based on the user device communicating with the first transceiver of the telecommunications network. Where a physical location of the first transceiver is known (because it was installed at a known physical location), and its Tx min is known (such as via an equal power boundary map), then a physical location of the user device can be determined to be in the physical area defined by the Tx min of the first transceiver.

In some embodiments, operation 608 comprises identifying a physical location of the user device based on the user device communicating with a first transceiver of the telecommunications network.

In some embodiments, operation 608 comprises determining that a user device's physical movements correspond to the user device being located at a first commercial location, based on the user device communicating with at least a first transceiver of a plurality of transceivers of a telecommunications network. After operation 608, the operating procedures of FIG. 6 move to operation 610.

Operation 610 depicts correlating the physical location information with other user information. This other user information can be, for example, demographic information about the user, such as a user's gender, age, or interests. A user can affirmatively consent to the use of this information. In some embodiments, a user can affirmatively provide this information. In some embodiments, this information can be gathered from a third party source, such as a source that provides demographic information for users. In some embodiments, this information can be stored for the user at a HSS/HLR.

In some embodiments, operation 604 comprises determining that the physical location of the user device corresponds to a first commercial location. In some embodiments, operation 610 comprises determining a home location of the user based on the user device communicating with the first transceiver or with a second transceiver of the telecommunications network.

Incorporating data from a third-party may be incorporated with the digital tracking data. In some embodiments, operation 610 comprises cross-correlating at least some information about the user with a database operated by an entity that is separate from an entity that operates the telecommunications network to determine additional information about the user.

In some embodiments, operation 610 comprises determining an identity of a user associated with the user device. In some embodiments, operation 610 comprises determining that at least one of the user device's physical movements corresponds to the user device being located at a first commercial location. In some embodiments, operation 610 comprises correlating the identity of the user with at least one demographic characteristic of the user.

In some embodiments, operation 610 comprises determining the identity of the user associated with the user device based on an IMSI of the user device that is correlated in a home subscriber server (HSS) of the telecommunications network with the identity of the user.

A user device can be correlated with a telecommunications network identifier that identifies which family plan the user device is on. In some embodiments, operation 610 comprises correlating the identity of the user with at least one identifier for the user that is maintained by the telecommunications network.

A user device and its associated digital tracking data can be correlated with information from multiple sources. In some embodiments, operation 610 comprises aggregating the indication that the user has visited the first commercial location with information from at least two other sources that are maintained by entities other than an entity that operates the telecommunications network before storing the indication that the user has visited the first commercial location.

In some embodiments, operation 610 comprises storing an indication that the user has visited the first commercial location in a computer memory. After operation 610, the operating procedures of FIG. 6 move to operation 612.

Operation 612 depicts anonymizing the information. For example, where personally identifiable information, such as a user's name, is contained in the information, this personally identifiable information may be stripped from the information that has been gathered. In some embodiments, user information may be aggregated so as to omit personally identifiable information about any single user. After operation 612, the operating procedures of FIG. 6 move to operation 614.

Operation 614 depicts securely storing the anonymized information. In some embodiments, the anonymized information may be stored by a HSS/HLR. This information may be stored securely, such as by using encryption, so as to secure the information from being accessed by unauthorized persons.

In some embodiments, operation 614 comprises storing an indication that the user has visited the first commercial location. In some embodiments, operation 614 comprises redacting or obfuscating at least a part of the identity of the user or the physical location of the user device before storing the indication that the user has visited the first commercial location in the memory. In some embodiments, at least some data is stored in a secure data store solely in aggregated form. After operation 614, the operating procedures of FIG. 6 end.

Determining a Path Traveled by a User Device from Digital Traffic Data

FIG. 7 illustrates a flow diagram of example operating procedures for determining a path traveled by a user device from digital traffic data. It can be appreciated that the operating procedures of FIG. 7 are example operating procedures, and that there can be examples that implement more or fewer operations than are depicted, or that implement the operations in a different order than is depicted here. For instance, in some examples, operation 702 of a user device communicating with a first transceiver can be implemented after operation 704 where a user device communicates with a second transceiver.

It can also be appreciated that multiple of the operating procedures of FIGS. 6-8 can be implemented together. For example, the operating procedures of FIG. 7 can be implemented to a path traveled by a user device from digital traffic data, and the operating procedures of FIG. 8 can be implemented to analyze that gathered digital traffic data.

In some examples, the example operating procedures 700 of FIG. 7 can be implemented by telecommunications network 100, and in particular traffic gathering and analysis system 118, of FIG. 1 to gather and analyze digital traffic of user device 114 as user device 114 physically moves relative to telecommunications network 100.

Operating procedures 700 begin with operation 702. Operation 702 depicts determining that a user device communicates with a first transceiver of a telecommunications network. In some examples, operation 702 can be implemented in a similar manner as operation 602 of FIG. 6 is implemented. After operation 702, the operating procedures of FIG. 7 move to operation 704.

Operation 704 depicts determining that a user device communicates with a second transceiver of the telecommunications network. In some examples, operation 704 can be implemented in a similar manner as operation 702 is implemented, but where the user device communicates with a second transceiver instead of a first transceiver (such as, using the example of FIG. 1, where user device 114 communicates with macrocell 106a in operation 702, and then user device 114 physically moves and then communicates with macrocell 106b in operation 704). After operation 704, the operating procedures of FIG. 7 move to operation 706.

Operation 706 depicts determining a physical path traveled by the user device. The data of the user device communicating with the first transceiver in operation 702, and the data of the user device communicating with the second transceiver in operation 704 may be used to determine a physical path traveled by the user device.

Determining a physical path traveled by the user device in operation 706 may be performed in a similar manner as described with respect to FIG. 5, where calculated user device path 510 is determined for user device 506 as user device 506 travels user device path 508 through a communication range of various transceivers. After operation 706, the operating procedures of FIG. 7 end.

Analyzing Digital Traffic Data

FIG. 8 illustrates a flow diagram of example operating procedures for analyzing digital traffic data. It can be appreciated that the operating procedures of FIG. 8 are example operating procedures, and that there can be examples that implement more or fewer operations than are depicted, or that implement the operations in a different order than is depicted here.

It can also be appreciated that multiple of the operating procedures of FIGS. 6-8 can be implemented together. For example, the operating procedures of FIG. 8 can be implemented analyze digital traffic data that is gathered through implementing the operating procedures of FIGS. 6 and/or 7.

In some examples, the example operating procedures 800 of FIG. 8 can be implemented by telecommunications network 100, and in particular traffic gathering and analysis system 118 of FIG. 1, to gather and analyze digital traffic of user device 114.

Operating procedures 800 begin with operation 802. Operation 802 depicts determining digital traffic data. Determining digital traffic data can be implemented in a similar manner as by implementing operating procedures 700 of FIG. 7. After operation 802, the operating procedures of FIG. 8 move to operation 804.

Operation 804 depicts determining a type of analysis to be performed. It may be that traffic gathering and analysis system 118 is configured to perform multiple types of analysis. In such situations, traffic gathering and analysis system 118 may receive user input at a user interface indicative of which type of analysis is to be performed on the data.

Where in operation 804 it is determined that the type of analysis to be performed is for a store location, then the operating procedures of FIG. 8 move to operation 806. Instead, where in operation 804 it is determined that the type of analysis to be performed is for shelf organization, then the operating procedures of FIG. 8 move to operation 808. Instead, where in operation 804 it is determined that the type of analysis to be performed is for inventory, then the operating procedures of FIG. 8 move to operation 810. Where in operation 804 it is determined that the type of analysis to be performed is for determining efficacy of a promotion, then the operating procedures of FIG. 8 move to operation 812.

Operation 806 is reached from operation 804 where it is determined in operation 804 that the type of analysis to be performed is for a store location. Operation 806 depicts determining a store location based on the digital traffic data. In some embodiments, he digital traffic data can be analyzed to determine paths that users travel, and a store location can be selected based on placing it close to a common path of the users, among other factors like cost of land and availability of land.

In some embodiments, where users start when traveling to a store may be analyzed to determine whether to locate a store closer to the starting location of some users.

In some embodiments, operation 806 comprises determining a physical location for a second commercial location based on at least one of the home location of the user, and the indication that the user has visited the first commercial location.

An optimal location for one new store can be determined based on information from one existing store, and based on optimizing travel time for users. In such embodiments, operation 806 can comprise determining a physical location for a second commercial location based on the indication that the user has visited the first commercial location, and minimizing a travel time for multiple users to visit one of the first commercial location or the second commercial location.

An optimal location for one new store can be determined based on information from multiple existing stores, and based on optimizing travel time for users. In such embodiments, operation 806 can comprise determining a physical location for a second commercial location based on the indication that the user has visited the first commercial location, and minimizing a travel time for multiple users to visit one of the first commercial location, the second commercial location, or a third commercial location.

Outside information can be analyzed to determine a store location. This outside information can include information from a real estate database, and can include information about a cost of opening and/or operating a store at a particular location, parking availability, tax costs, project maintenance costs, securities costs, and utility costs. In such embodiments, operation 806 can comprise determining information about a plurality of possible commercial locations, the information including location cost, parking availability, tax liability, project maintenance costs, security costs, and utility costs. In these embodiments, operation 806 can also comprise determining a physical location for a second commercial location of the plurality of possible commercial indications based on the indication that the user has visited the first commercial location, and at least some of the information about the plurality of possible commercial locations. After operation 806, the operating procedures of FIG. 8 end.

Operation 808 is reached from operation 804 where it is determined in operation 804 that the type of analysis to be performed is for shelf organization. Operation 808 depicts determining shelf organization based on the digital traffic data. In some embodiments, where users travel within a store can be used to determine shelf organization of inventory within that store.

For example, a store might wish to place certain items (such as seasonal inventory that the store is attempting to sell its stock of) on shelf space that is located in high user-traffic areas. By analyzing where those high user-traffic areas are within a store, store management can determine the shelf space that corresponds to those high user-traffic areas, and stock that shelf space accordingly.

The location of users within stores can be analyzed, such as by identifying how long customers spend in specific parts of a store, and using that information to make shelf-organization decisions. In such embodiments, operation 808 can comprise determining an amount of time that the user spends in a first place within the first commercial location based on the user device communicating with at least the first transceiver of a plurality of transceivers. In such embodiments, operation 808 can also comprise determining how to stock inventory at the first place based on the amount of time that the user spends in the first place.

Demographic information may also be correlated with a user, and inventory-placement decisions may be made based on this demographic information. In such embodiments, operation 808 can comprise determining demographic information about the user, and determining how to organize inventory within the first commercial location based on the demographic information about the user. After operation 808, the operating procedures of FIG. 8 end.

Operation 810 is reached from operation 804 where it is determined in operation 804 that the type of analysis to be performed is for inventory. Operation 810 depicts determining inventory based on the digital traffic data. In some embodiments, there may be expensive items for sale that many users come and look at multiple times before making a purchase decision.

Where digital traffic data is analyzed to determine that there is an uptick in user traffic near locations where these expensive items are displayed, this can be interpreted as indicating that there will be an uptick in sales of these items in the near future. In such a case, more inventory may be ordered, so that the store does not run out of inventory of these expensive items when users attempt to purchase them. After operation 810, the operating procedures of FIG. 8 end.

Operation 810 is reached from operation 804 where it is determined in operation 804 that the type of analysis to be performed is for determining efficacy of a promotion. Operation 812 depicts determining the efficacy of a promotion based on the digital traffic data. In some embodiments, users can be offered promotions to buy certain items. Then, using intra-store digital tracking information, the efficacy of that promotion leading to a sale may be determined.

For example, a beacon near where a promoted item may identify that the user has come near the item. Then, a beacon near the check out registers may identify that the user stayed in an area near the check out registers for a period of time that corresponds to the user making a purchase. Based on this information, a likelihood that the user purchased the promoted item may be determined. Then, a likelihood that each user who received the promotion went on to purchase the promoted item may be determined, and the results aggregated to determine an efficacy of the promotion (e.g., that 3% of promotion recipients went on to purchase the item).

Demographic information may also be correlated with a user, and this information can be used to determine additional inventory of specific products to purchase, or otherwise obtain. In such embodiments, operation 812 can comprise determining demographic information about the user, and determining additional inventory to acquire for the first commercial location based on the demographic information about the user. After operation 812, the operating procedures of FIG. 8 end.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
at least one processor; and
at least one memory communicatively coupled to the at least one processor, the at least one memory bearing processor-executable instructions that, upon execution by the at least one processor, cause the system at least to:
determine an identity of a user associated with a user device that communicates with a telecommunications network;
determine a home location of the user based at least on the user device communicating with a first transceiver of the telecommunications network;
identify a physical location of the user device based at least on the user device communicating with a second transceiver of the telecommunications network;
determine that the physical location of the user device corresponds to a first commercial location of an entity;
receive data indicating that the user device was communicating with a third transceiver of the telecommunications network for a first period of time and data indicating a first method of communication between the user device and the third transceiver;
receive data indicating that the user device was communicating with a fourth transceiver of the telecommunications network for a second period of time, data indicating a second method of communication between the user device and the telecommunications network, and data indicating that the user device communicated with the fourth transceiver after communicating with the third transceiver;
based on the user device communicating with the third transceiver for the first period of time, the first method of communication between the user device and the third transceiver, the user device communicating with the fourth transceiver for the second period of time, the second method of communication between the user device and the fourth transceiver, and the user device communicating with the fourth transceiver after communicating with the third transceiver, generate a route traveled by the user device from the home location to the physical location;
determine that a second commercial location of the entity is located along the route traveled by the user device from the home location to the first commercial location;
determine a characteristic of the second commercial location;
based on (i) determining that the physical location of the user device corresponds to the first commercial location, (ii) determining that the second commercial location is along the route traveled by the user device from the home location to the first commercial location, (iii) the route traveled by the user device from the home location to the first commercial location, and (iv) the characteristic of the second commercial location, determine that the user has visited the first commercial location and did not visit the second commercial location while the user device traveled the route from the home location to the first commercial location; and
based on determining that the user has visited the first commercial location and did not visit the second commercial location while the user device traveled the route from the home location to the first commercial location, provide, for output, a recommendation indicating whether to close or relocate the second commercial location.

2. The system of claim 1, wherein the instructions that, upon execution by the at least one processor, further cause the system at least to:
prompt the user of the user device to share data.

3. The system of claim 1, wherein the instructions that, upon execution by the at least one processor, further cause the system at least to:
redact or obfuscate at least a part of the identity of the user or the physical location of the user device.

4. The system of claim 1, wherein at least some data is stored in a secure data store solely in aggregated form.

5. The system of claim 1, wherein the instructions that, upon execution by the at least one processor, further cause the system at least to:
determine an additional physical location of the second commercial location based at least on the user device communicating with a fifth transceiver of the telecommunications network.

6. The system of claim 1, wherein:
providing, for output, the recommendation to close or relocate the second commercial location is based further on a number of times the user visits the second commercial location relative to the first commercial location.

7. The system of claim 1, wherein the instructions that, upon execution by the at least one processor, further cause the system at least to:
cross-correlate at least some information about the user with a database operated by an entity that is separate from an entity that operates the telecommunications network to determine additional information about the user.

8. The system of claim 1, wherein:
the telecommunications network comprises a fifth transceiver that has a range that is confined to a physical area corresponding to the first commercial location, and
the instructions that, upon execution by the at least one processor, further cause the system at least to:
determine that user device is communicating with the fifth transceiver; and confirm that the user has visited the first commercial location.

9. The system of claim 1, wherein the instructions that, upon execution by the at least one processor, further cause the system at least to:
determine the identity of the user associated with the user device based at least on an International Mobile Subscriber Identity (IMSI) of the user device that is stored in a home subscriber server (HSS) of the telecommunications network.

10. The system of claim 1, wherein the instructions that, upon execution by the at least one processor, further cause the system at least to:
aggregate the indication that the user has visited the first commercial location with information from at least two other sources that are maintained by entities other than an entity that operates the telecommunications network.

11. The system of claim 1, wherein the first method of communication between the user device and the third transceiver or the second method of communication between the user device and the third transceiver comprises:
an LTE protocol that does not include providing telecommunications functionality to the user device.

12. A computer-implemented method, comprising:
tracking a user device's physical movements as the user device communicates with a first transceiver of a plurality of transceivers of a telecommunications network;
identifying a user associated with the user device;
determining a home location of the user based at least on the user device communicating with the first transceiver of the telecommunications network;
determining that at least one of the user device's physical movements corresponds to the user device being located at a first commercial location of an entity;
receiving data indicating that the user device was communicating with a second transceiver of the telecommunications network for a first period of time and data indicating a first method of communication between the user device and the second transceiver;
receiving data indicating that the user device was communicating with a third transceiver of the telecommunications network for a second period of time, data indicating a second method of communication between the user device and the telecommunications network, and data indicating that the user device communicated with the third transceiver after communicating with the second transceiver;
based on the user device communicating with the second transceiver for the first period of time, the first method of communication between the user device and the second transceiver, the user device communicating with the third transceiver for the second period of time, the second method of communication between the user device and the third transceiver, and the user device communicating with the third transceiver after communicating with the second transceiver, generating a route traveled by the user device from the home location to the first commercial location;
determining that a second commercial location of the entity is located along the route traveled by the user device from the home location to the first commercial location;
determining a characteristic of the second commercial location;
based on (i) determining that the physical location of the user device corresponds to the first commercial location, (ii) determining that the second commercial location is along the route traveled by the user device from the home location to the first commercial location, (iii) the route traveled by the user device from the home location to the first commercial location, and (iv) the characteristic of the second commercial location, determining that the user has visited the first commercial location and did not visit the second commercial location while the user device traveled the route from the home location to the first commercial location; and
based on determining that the user has visited the first commercial location and did not visit the second commercial location while the user device traveled the route from the home location to the first commercial location, providing, for output, a recommendation indicating whether to close or relocate the second commercial location.

13. The computer-implemented method of claim 12, further comprising:
determining the identity of the user associated with the user device based at least on an International Mobile Subscriber Identity (IMSI) of the user device that is stored in a home subscriber server (HSS) of the telecommunications network.

14. The computer-implemented method of claim 12, further comprising:
correlating the identity of the user with at least one identifier for the user that is maintained by the telecommunications network.

15. The computer-implemented method of claim 12, further comprising:
correlating the identity of the user with at least one demographic characteristic of the user.

16. The computer-implemented method of claim 12, further comprising:
aggregating the indication that the user has visited the first commercial location with information from at least two other sources that are maintained by entities other than an additional entity that operates the telecommunications network.

17. The computer-implemented method of claim 12, further comprising:
obfuscating at least a part of the identity of the user or a physical location of the user device.

18. The computer-implemented method of claim 12, wherein:
providing, for output, the recommendation to close or relocate the second commercial location is based further on a number of times the user visits the second commercial location relative to the first commercial location.

19. The computer-implemented method of claim 12, wherein the telecommunications network comprises a fourth transceiver that has a range that is confined to a physical area corresponding to the first commercial location, further comprising:
determining that user device is communicating with the fourth transceiver; and
confirming that the user has visited the first commercial location.

20. The computer-implemented method of claim 19, further comprising:

determining an amount of time that the user spends in a place within the first commercial location based at least on the user device communicating with the fifth transceiver.

21. One or more non-transitory computer-readable media of a computing device storing computer-executable instructions that upon execution cause one or more computers to perform acts comprising:

determining an identity of a user associated with a user device that communicates with a telecommunications network;

determining a home location of the user based at least on the user device communicating with a first transceiver of the telecommunications network;

identifying a physical location of the user device based at least on the user device communicating with a second transceiver of the telecommunications network;

determining that the physical location of the user device corresponds to a first commercial location of an entity;

receiving data indicating that the user device was communicating with a third transceiver of the telecommunications network for a first period of time and data indicating a first method of communication between the user device and the third transceiver;

receiving data indicating that the user device was communicating with a fourth transceiver of the telecommunications network for a second period of time, data indicating a second method of communication between the user device and the telecommunications network, and data indicating that the user device communicated with the fourth transceiver after communicating with the third transceiver;

based on the user device communicating with the third transceiver for the first period of time, the first method of communication between the user device and the third transceiver, the user device communicating with the fourth transceiver for the second period of time, the second method of communication between the user device and the fourth transceiver, and the user device communicating with the fourth transceiver after communicating with the third transceiver, generating a route traveled by the user device from the home location to the physical location;

determining that a second commercial location of the entity is located along the route traveled by the user device from the home location to the first commercial location;

determining a characteristic of the second commercial location;

based on (i) determining that the physical location of the user device corresponds to the first commercial location, (ii) determining that the second commercial location is along the route traveled by the user device from the home location to the first commercial location, (iii) the route traveled by the user device from the home location to the first commercial location, and (iv) the characteristic of the second commercial location, determining that the user has visited the first commercial location and did not visit the second commercial location while the user device traveled the route from the home location to the first commercial location; and based on determining that the user has visited the first commercial location and did not visit the second commercial location while the user device traveled the route from the home location to the first commercial location, providing, for output, a recommendation indicating whether to close or relocate the second commercial location.

* * * * *